UNITED STATES PATENT OFFICE.

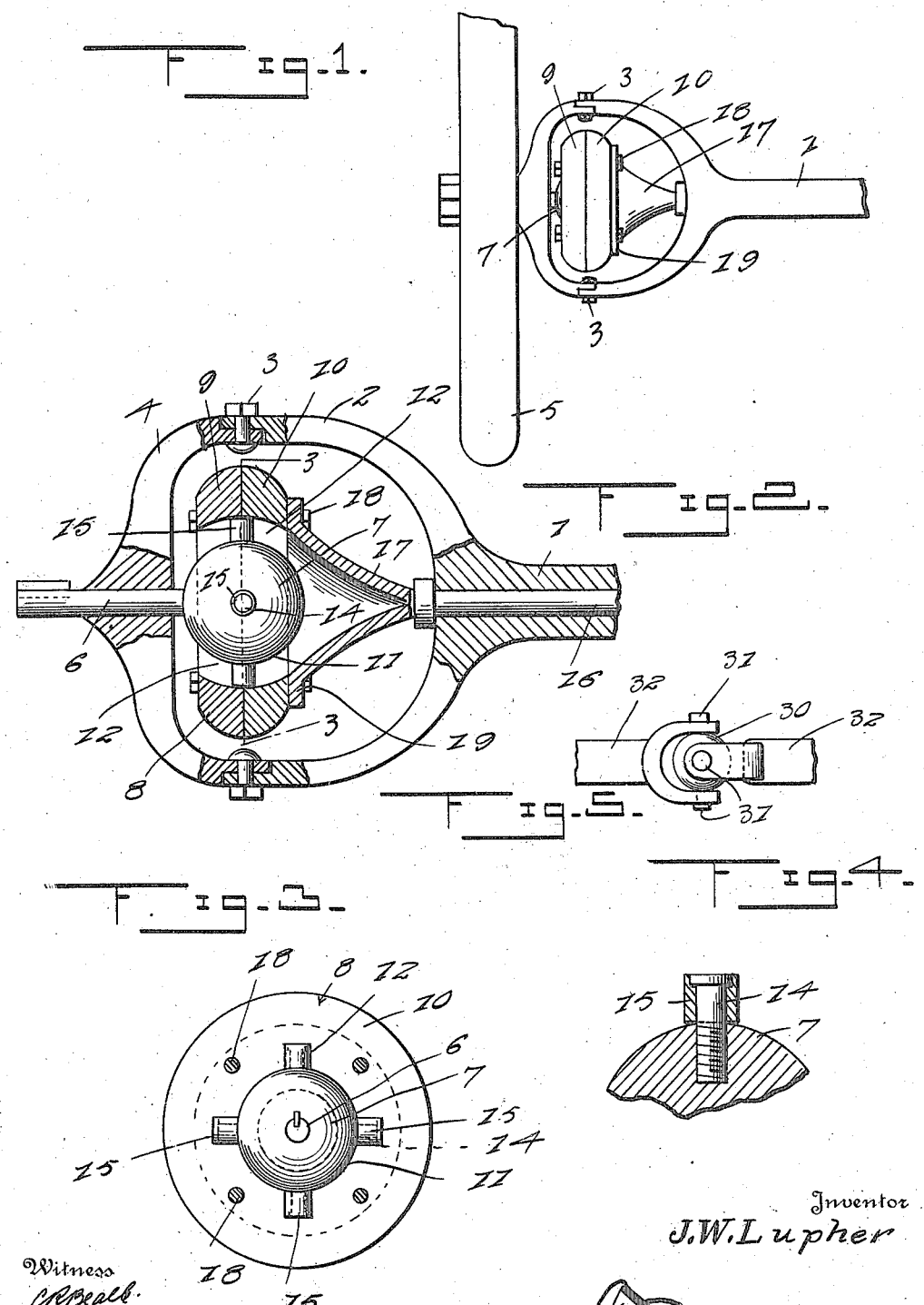

JAMES W. LUPHER, OF MUSKEGON, MICHIGAN.

COMBINATION STEERING AND DRIVING AXLE FOR MOTOR-VEHICLES.

1,233,487.  Specification of Letters Patent.  Patented July 17, 1917.

Application filed May 26, 1916. Serial No. 100,077.

*To all whom it may concern:*

Be it known that I, JAMES W. LUPHER, a citizen of the United States, residing at Muskegon, in the county of Muskegon and State of Michigan, have invented certain new and useful Improvements in Combination Steering and Driving Axles for Motor-Vehicles; and I do hereby declare the following to be a full, clear, and exact description of the invention, such as will enable others skilled in the art to which it appertains to make and use the same.

This invention relates to motor vehicles, and more particularly to that class in which the front or steering wheels are operatively connected to the driving mechanism so that four wheel traction is permitted and the primary object of the invention is the provision of a particular construction of the connection between the wheel carrying spindles and the driving axle whereby the front wheels may be both driven and steered.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a front elevation of the combined steering and driving axle showing the same applied to a fragment of a motor vehicle.

Fig. 2 is a vertical section through the axle illustrating parts of the knuckle joint in section.

Fig. 3 is a section on the line 3—3 of Fig. 2, and

Fig. 4 is a fragmentary section through a part of the structure.

Fig. 5 is a side elevation of a universal joint employing the ball having a plurality of radiating pins extending therefrom.

Referring more particularly to the drawing, 1 designates the casing of the front axle of any ordinary type of motor vehicle, which is pivotally connected through the medium of arms 2 and bolts 3 to the arms 4 of the wheel carrying spindle casing. The spindle or stub axle upon which the wheels 5 of the motor vehicle are mounted is indicated by the numeral 6 and it has its inner end seated in and keyed to a ball or sphere 7. The ball 7 is rotatably supported by a casing 8. The casing is composed of a pair of connected plates 9 and 10, which are provided with substantially semicircular openings 11 in which the ball 7 is seated. The plates 9 and 10 are further provided with a plurality of grooves or recesses 12 which extend transversely through the plates and form guide ways for the movement of pins 14 which are carried by the ball 7. The guide ways 12 formed in the plate 9 aline with guide ways formed in the plate 10 as clearly shown in Fig. 2 of the drawing. The pins 14 are detachably connected to the ball 7 and they have bearing thimbles or rollers 15 mounted about their outer ends which rollers engage the walls of the guide ways 12 and are rotatably mounted upon the heads of the pins for relieving friction between the pins and the walls of the guide ways during the universal movement of the ball 7.

The guide ways 12 are formed so as to permit of a limited rotary movement of the ball 7 transversely to the direction in which the ball is rotated by the drive axle 16, so as to permit of the steering of the wheels 5 of the motor vehicle. The front drive axle 16 is operatively connected to the casing 8 by a substantially cone shaped coupling 17. The coupling 17 is connected to the sections or plates 9 and 10 by bolts 18 which extend through an annular flange 19 formed upon the base of the coupling and through the plates 9 and 10.

The rollers 15 carried by the pins 14 striking the walls of the recesses or guide ways 12, will cause the ball 7 and consequently the spindle 6 which is keyed thereto to rotate in the same direction as the rotation of the shaft 16 for transmitting power from the shaft or axle 16 to the spindle 6 and the guide ways will permit of the steering movement of the spindle 6 and the wheels carried thereby.

In Fig. 5 of the drawing, a universal joint is illustrated which includes the ball or sphere 30 having a plurality of radiating pins 31 connected thereto, which ball or sphere is identical in construction to the ball or sphere 7. The pins 31 have forked arms 32 connected thereto, for forming a universal joint.

In reducing the invention to practice, certain minor features of construction, combination and arrangement of parts may necessitate alterations to which the patentee is entitled provided such alterations are comprehended within the scope of what is claimed.

What is claimed is:—

A combined steering and driving axle including a casing, an axle journaled in the casing and having one of its ends projecting beyond one end of the casing; a collar on said end of the axle engaging said end of the casing to prevent endwise movement of the axle with relation to the casing, a horizontally disposed conical coupling member secured at its apex to said end of the axle, a flange formed on and extending radially from the base of the coupling, centrally apertured plates, means securing the plates in assembly and to said flange, said plates having guide ways, a ball located within the apertures in the plates, pins carried by the ball fitting in said guide ways, and a spindle carried by the ball.

In testimony whereof I affix my signature in presence of two witnesses.

JAMES W. LUPHER.

Witnesses:
PETER O. HOLTHE,
FRED M. BRUNNINGER.

Copies of this patent may be obtained for five cents each, by addressing the "Commissioner of Patents Washington, D. C."